US010200574B2

(12) United States Patent
Chou et al.

(10) Patent No.: US 10,200,574 B2
(45) Date of Patent: Feb. 5, 2019

(54) METHOD AND SYSTEM FOR GENERATING A VIDEO FRAME

(71) Applicant: Industrial Technology Research Institute, Hsinchu (TW)

(72) Inventors: Yeh-Kai Chou, Hsinchu (TW); Luo-Wei Tsai, Hsinchu (TW); Hui-Ping Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 15/377,634

(22) Filed: Dec. 13, 2016

(65) Prior Publication Data
US 2018/0139362 A1    May 17, 2018

(30) Foreign Application Priority Data

Nov. 11, 2016 (TW) .............................. 105136858 A

(51) Int. Cl.
*H04N 5/14* (2006.01)
*H04N 7/18* (2006.01)
(Continued)

(52) U.S. Cl.
CPC ........... *H04N 5/144* (2013.01); *B64C 39/024* (2013.01); *G05D 1/0038* (2013.01); *G06T 5/005* (2013.01);
(Continued)

(58) Field of Classification Search
None
See application file for complete search history.

(56) References Cited

U.S. PATENT DOCUMENTS

| 7,616,782 B2 | 11/2009 | Badawy |
| 8,610,608 B2 | 12/2013 | Ratnakar Aravind et al. |

(Continued)

FOREIGN PATENT DOCUMENTS

| CN | 102123234 A | 7/2011 |
| CN | 105405319 A | 3/2016 |

(Continued)

OTHER PUBLICATIONS

Criminisi et al., "Region Filling and Object Removal by Exemplar-Based Image Inpainting, IEEE Transaction on Image Processing, vol. 13, No. 9, Sep. 2004" (Year: 2004).*

(Continued)

*Primary Examiner* — Mohammad J Rahman
(74) *Attorney, Agent, or Firm* — Mintz Levin Cohn Ferris Glovsky and Popeo, P.C.; Peter F. Corless; Steven M. Jensen

(57) ABSTRACT

The present disclosure provides a method for generating a video frame and a system thereof, including: receiving at least two frames of a video captured by an image capture unit through a network; calculating a first set of optical flow vectors of the at least two frames by a first algorithm; generating a set of modified vectors according to at least one parameter; combining the set of modified vectors and the first set of optical flow vectors to obtain a second set of optical flow vectors; and shifting one of the at least two frames according to the second set of optical flow vectors to generate a virtual image. Therefore, the present disclosure can reduce deviation caused by the latency of the network and improve user experience.

15 Claims, 6 Drawing Sheets

(51) Int. Cl.
*H04N 5/262* (2006.01)
*G06T 5/00* (2006.01)
*B64C 39/02* (2006.01)
*G05D 1/00* (2006.01)
*H04N 7/01* (2006.01)

(52) U.S. Cl.
CPC .......... *H04N 5/2621* (2013.01); *H04N 7/183* (2013.01); *B64C 2201/127* (2013.01); *G06T 2207/10016* (2013.01); *G06T 2207/10032* (2013.01); *H04N 5/145* (2013.01); *H04N 7/014* (2013.01)

(56) References Cited

U.S. PATENT DOCUMENTS

| | | | |
|---|---|---|---|
| 8,774,950 B2 | 7/2014 | Kelly et al. | |
| 8,928,813 B2* | 1/2015 | Liu | H04N 5/213 348/609 |
| 9,350,969 B2* | 5/2016 | Cohen | H04N 13/106 |
| 9,380,286 B2* | 6/2016 | Cohen | H04N 13/111 |
| 9,602,814 B2* | 3/2017 | Bhagavathy | H04N 19/119 |
| 2004/0057446 A1 | 3/2004 | Varsa et al. | |
| 2005/0275727 A1* | 12/2005 | Lai | H04N 5/23248 348/208.1 |
| 2006/0125835 A1 | 6/2006 | Sha et al. | |
| 2006/0257042 A1* | 11/2006 | Ofek | G06T 5/005 382/255 |
| 2009/0300692 A1* | 12/2009 | Mavlankar | H04N 21/234318 725/94 |
| 2011/0013028 A1* | 1/2011 | Zhou | G06T 3/4038 348/208.6 |
| 2011/0273582 A1 | 11/2011 | Gayko et al. | |
| 2012/0105728 A1* | 5/2012 | Liu | H04N 5/213 348/607 |
| 2013/0156297 A1* | 6/2013 | Shotton | G06K 9/6255 382/159 |
| 2014/0072228 A1* | 3/2014 | Rubinstein | G06T 7/207 382/197 |
| 2014/0072229 A1* | 3/2014 | Wadhwa | G06K 9/481 382/197 |
| 2014/0348249 A1 | 11/2014 | Sullivan | |
| 2015/0281597 A1* | 10/2015 | Salvador Marcos | G06T 3/4053 348/659 |
| 2016/0068114 A1 | 3/2016 | Liao | |
| 2016/0134673 A1 | 5/2016 | MacInnis | |

FOREIGN PATENT DOCUMENTS

| | | |
|---|---|---|
| TW | 200824433 A | 6/2008 |
| TW | I444593 B | 7/2014 |
| TW | 201523516 A | 6/2015 |

OTHER PUBLICATIONS

Roberts, Richard, et al., "Learning General Optical Flow Subspaces for Egomotion Estimation and Detection of Motion Anomalies," Computer Vision and Pattern Recognition, 2009, pp. 57-64.

Pintea, S. L., "Dejavu: Motion Prediction in Static Images," European Conference on Computer Vision, 2014, pp. 172-187.

Rosello, Pol, "Predicting Future Optical Flow from Static Video Frames," Technical Report, Stanford University, 2016. pp. 1-16.

Zhang, Qing and Jiagun Lin, J., "Exemplar-based Image Inpainting Using Color Distribution Aalysis," Inf. Sci. Eng., 2012, pp. 641-654.

Criminisi, Antonio, et al., "Region filling and object removal by exemplar-based inpainting," IEEE Transactions on Image Processing, 2004, pp. 1200-1212.

Wang, Lu, et al., "The adaptive compensation algorithm for small UAV image stabilization," IEEE International Geoscience and Remote Sensing Symposium, 2012, 4391-4394.

Walker, Jacob, et al., "Dense Optical Flow Prediction from a Static Image," IEEE International Conference on Computer Vision, 2015, pp. 2443-2451.

Mathieu, Matthew, et al., "Deep multi-scale video production beyond mean square error," Conference Paper, ICLR 2016, 2015, pp. 1-14.

Shaou-Gang Miaou, "The technical level of a person having ordinary skill in the art is determined by reference to 'Digital Image Processing—Using Matlab nimbly, second education'," Dec. 2015.

* cited by examiner

METHOD AND SYSTEM FOR GENERATING A VIDEO FRAME

CROSS-REFERENCE TO RELATED APPLICATION

The present disclosure is based on, and claims priority from, Taiwan Application Number 105136858, filed Nov. 11, 2016, the disclosure of which is hereby incorporated by reference herein in its entirety.

BACKGROUND

1. Technical Field

The present disclosure relates to methods and systems for generating a video frame, and, more particularly, to a method and a system for generating a video frame that address the deviation caused by the latency of the network.

2. Description of the Prior Art

Unmanned vehicles (e.g., cars or aircrafts) are usually remotely controlled by viewing images from a first person perspective. The images captured by unmanned vehicles are usually transmitted to a remote display via a mobile broadband network using, for example, 2.4 GHz automatic frequency hopping technology. However, the video stream data of a typical image is bandwidth-demanding, and the mobile broadband network often has latency (e.g., in the order of tens of milliseconds or even 1 to 2 seconds), resulting in non-real time transmission of images to the remote display. If a user is controlling an unmanned vehicle by looking at the delayed video images, the deviation or collision of the unmanned vehicle may occur.

Accordingly, there is an imperative need for a method and a system for generating a video frame that address the aforementioned issues in the prior art.

SUMMARY

The present disclosure provides a method for generating a video frame, which may include: obtaining at least two frames in a video captured by an image capture unit through a network; calculating a first set of optical flow vectors of the at least two frames by a first algorithm; generating a set of modified vectors according to at least one parameter; combining the set of modified vectors and the first set of optical flow vectors to obtain a second set of optical flow vectors; and shifting one of the at least two frames according to the second set of optical flow vectors to generate a virtual image.

The present disclosure provides a system for generating a video frame, which may include: an image capture unit for capturing a video; and a calculation unit connected with the image capture unit through a network and configured for receiving at least two frames in the video, wherein the calculation unit includes: a modified vector generating module configured for generating a set of modified vectors based on at least one parameter; an optical flow vector generating module configured for calculating a first set of optical flow vectors of the at least two frames by a first algorithm, and combining the set of modified vectors and the first set of optical flow vectors to generate a second set of optical flow vectors; and a virtual image generating module configured for shifting one of the at least two frames based on the second set of optical flow vectors to generate a virtual image.

DETAILED DESCRIPTION

Figure 1:
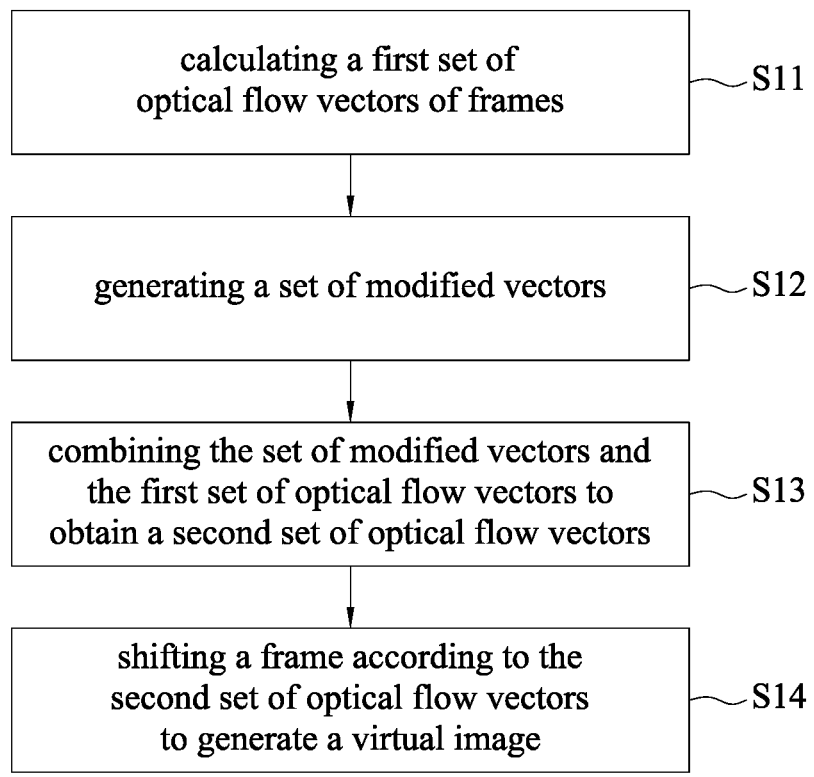
FIG. 1 is a flowchart illustrating a method for generating a video frame in accordance with a first embodiment of the present disclosure.
Figure 2:
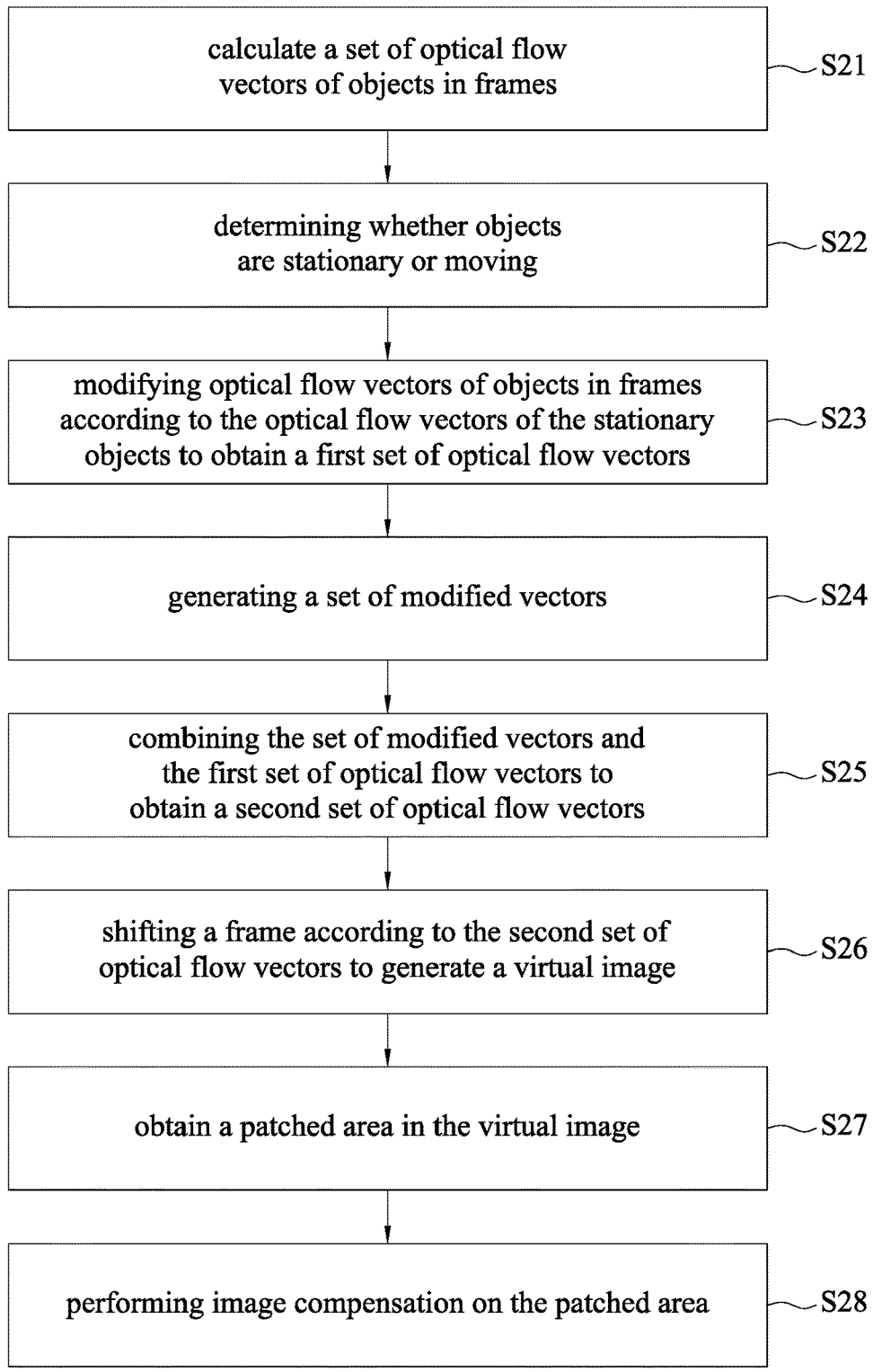
FIG. 2 is a flowchart illustrating a method for generating a video frame in accordance with a second embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a method for generating a video frame of the present disclosure includes steps S11 to S14. In step S11, a first set of optical flow vectors of frames is calculated by a first algorithm. In an embodiment, at least two frames of a video is captured by an image capture unit through a network, and a first set of optical flow vectors of the least two frames is calculated by a first algorithm. In an embodiment, the at least two frames are contiguous or non-contiguous frames in time, and an object that appears in both of the at least two frames is used as a reference. In an embodiment, the image capture unit can be installed on an unmanned vehicle (e.g., car or aircraft), and the video captured by the image capture unit is obtained while the unmanned vehicle is moving.

Upon obtaining the at least two frames, an optical flow estimation technique is used for estimating a motion vector of each object in the frames. In an embodiment, Lucas-Kanade optical flow method can be used for calculation in order to obtain a first set of optical flow vectors. The method proceeds to step S12.

In step S12, a set of modified vectors is generated. In an embodiment, a set of modified vectors is generated according to at least one parameter. In an embodiment, the parameter is the latency information of the network, a direction of the image capture unit, a speed of the image capture unit, or a combination thereof. The method proceeds to step S13.

In step S13, the set of modified vectors and the first set of optical flow vectors are combined to obtain a second set of optical flow vectors. The method proceeds to step S14.

In step S14, one of the at least two frames is shifted according to the second set of optical flow vectors to generate a virtual image. In an embodiment, a frame that occurs later in time can be chosen as the frame being shifted, but the present disclosure is not limited as such.

Referring to FIGS. 2 to 6, a method for generating a video frame in accordance with a second embodiment of the present disclosure is shown. The technical contents of the second embodiment below can also be applied to the previous first embodiment.

Figure 3:
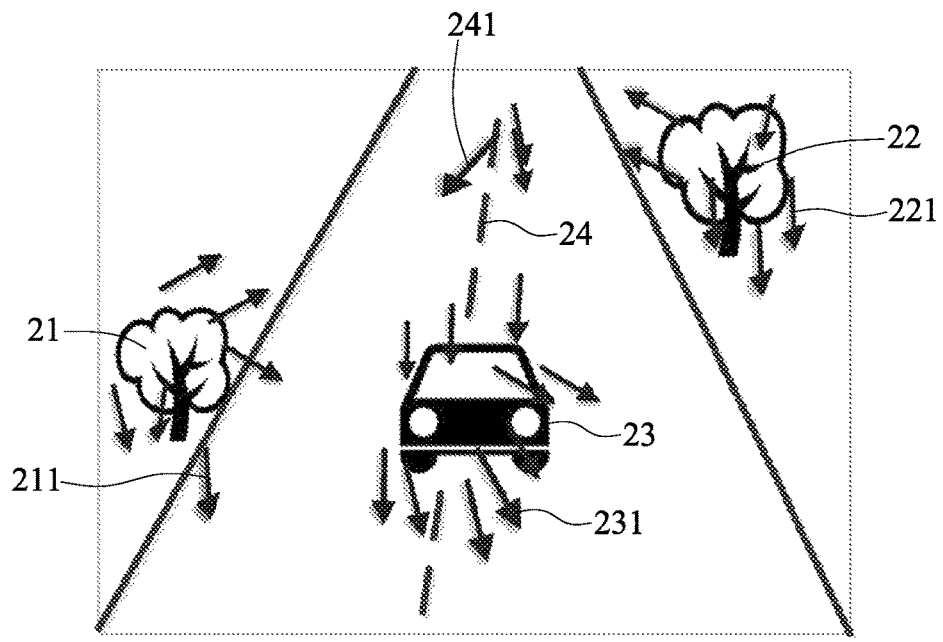
FIG. 3 is a schematic diagram depicting optical flow vectors of objects in a frame in accordance with the present disclosure.

In step S21, at least two frames of a video is captured by an image capture unit through a network, and a set of optical flow vectors of the least two frames is calculated by a first algorithm. As shown in FIG. 3, optical flow vectors 211, 221, 231 and 241 of objects 21, 22, 23 and 24 in a frame are calculated by the first algorithm, to generate the set of optical flow vectors.

In an embodiment, the first algorithm is optical flow estimation. Assuming that an optical flow is constant within a neighborhood of a pixel, if one wishes to estimate a pixel I(x, y) in a frame I in a pixel H(x, y) in a frame H, it can be regarded as finding all pixels in the neighborhood, and its fundamental optical flow equation can be given as follows:

$$E(u, v) = \sum_{x,y}(I(x+u, y+v) - H(x, y))^2 = \sum_{x,y}(I(x, y) - H(x, y) + uI_x + vI_y)^2,$$

wherein u and v are the displacement vectors of the pixel. As such, the optical flow vectors 211, 221, 231 and 241 of the objects 21, 22, 23 and 24 in the frame can be calculated to obtain a set of optical flow vectors. In another embodiment, Lucas-Kanade optical flow method may also be used, and in addition to pixels, the calculation can be made in regards to blocks, but the present disclosure is not limited as such. The method proceeds to step S22.

In step S22, it is determined whether an object is stationary or moving. Since the image capture unit is installed on a moving remotely controlled unmanned vehicle (e.g., an unmanned aerial vehicle or an unmanned car), the video images captured are not stationary, but the objects in the frames of the video will have relative displacements with respect to the movement of the remotely controlled unmanned vehicle. Thus, it is determined whether the objects 21, 22, 23 and 24 shown in FIG. 3 are stationary or moving based on characteristic point directionality in conjunction with an associated learning mechanism (such as an artificial intelligent neural network etc.). For example, as shown in FIG. 3, the objects 21 and 22 are trees, and should be determined as stationary objects; the object 24 is a zebra crossing, and should also be determined as a stationary object; and the object 23 is a car, and should be determined as a moving object. This is called ego-motion estimation. The method proceeds to step S23.

Figure 4:
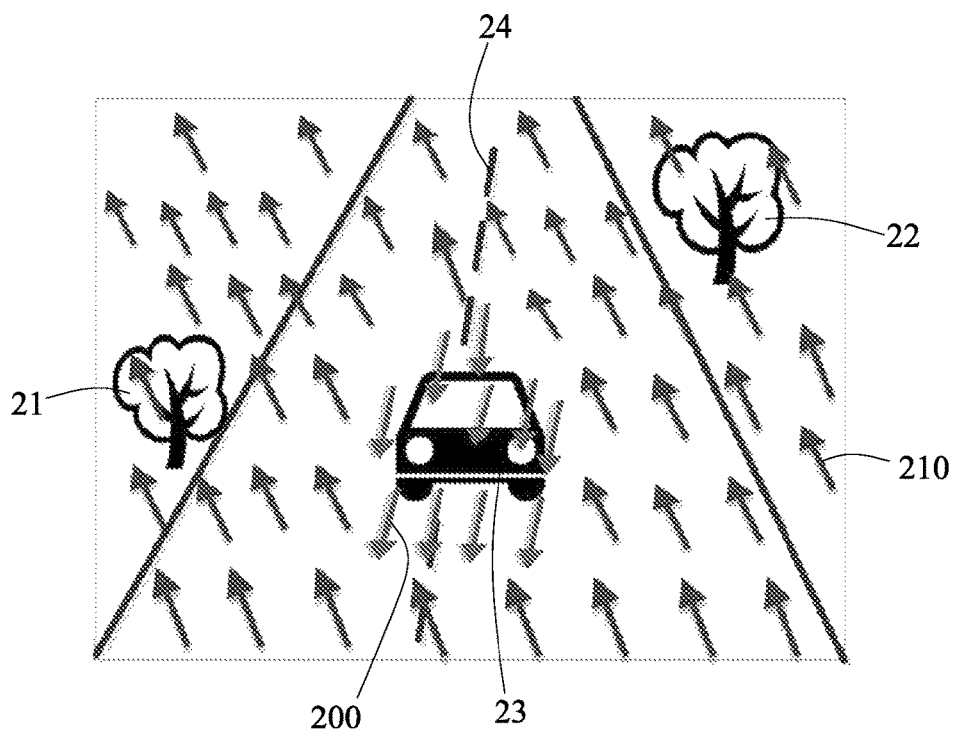
FIG. 4 is a schematic diagram depicting a first set of optical flow vectors of the objects in the frame in accordance with the present disclosure.

In step S23, the optical flow vectors 211, 221, 231 and 241 of the objects 21, 22, 23 and 24 in the at least two frames are adjusted based on the optical flow vectors 211, 221 and 241 of the stationary objects 21, 22 and 24. As shown in FIG. 4, the optical flow vector 231 of the object 23 becomes the first optical flow vector 200, while the optical flow vectors 211, 221 and 241 of the objects 21, 22 and 24 become the first optical flow vectors 210, thereby obtaining a set of the first optical flow vectors 200 and 210. Next, proceed to step S24.

Figure 5:
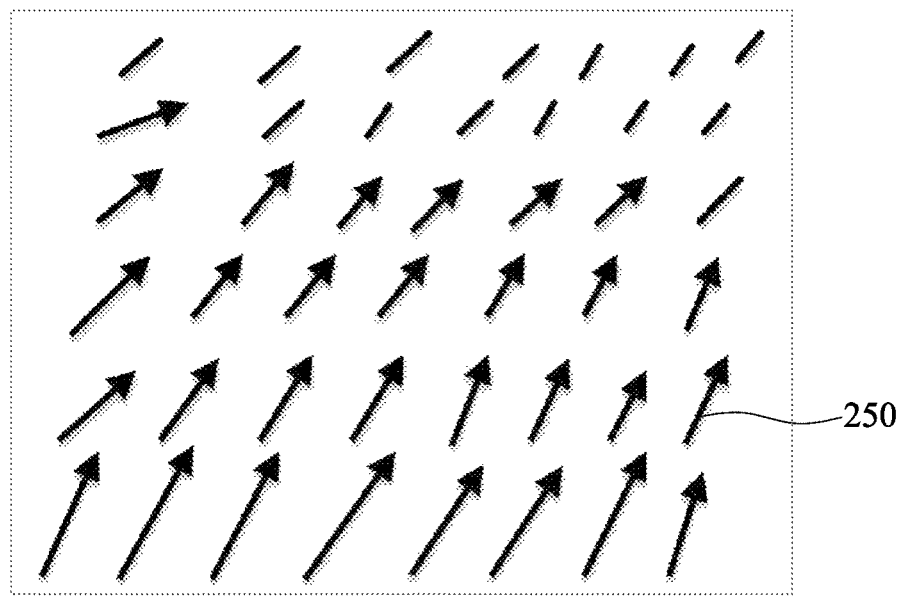
FIG. 5 is a schematic diagram depicting a set of modified vectors in accordance with the present disclosure.

In step S24, a set of modified vectors is generated. In an embodiment, a set of modified vectors is generated according to at least one parameter. In an embodiment, wherein the parameter is the latency information of the network, the direction of the image capture unit, the speed of the image capture unit, or a combination thereof. For example, assuming that the remotely controlled unmanned vehicle exhibits a linear motion in a very short period of time, with the latency information of the network, vector values indicating the forward or backward motions of the first optical vectors 200 and 210 as shown in FIG. 4 can be readily estimated, thereby forming a set of modified vectors 250 as shown in FIG. 5. Alternatively, using the direction of the image capture unit or the speed of the image capture unit, vectors values indicating which direction in which the first optical flow vectors 200 and 210 shown in FIG. 4 should move can be estimated, thereby forming a set of modified vectors 250 as shown in FIG. 5.

Figure 6:
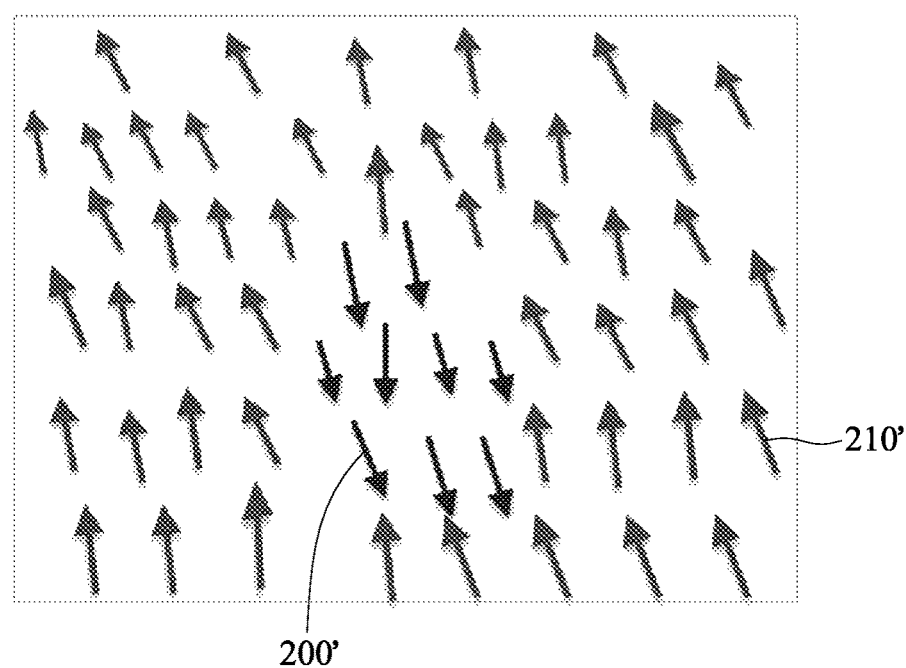
FIG. 6 is a schematic diagram depicting a second set of optical flow vectors in accordance with the present disclosure.

As shown in step S25, as shown in FIGS. 4, 5 and 6, the set of modified vectors 250 and the first set of optical flow vectors 200 and 210 are combined to obtain a second set of optical flow vectors 200' and 210'. This is purely vector operations. The method proceeds to step S26.

Figure 7:
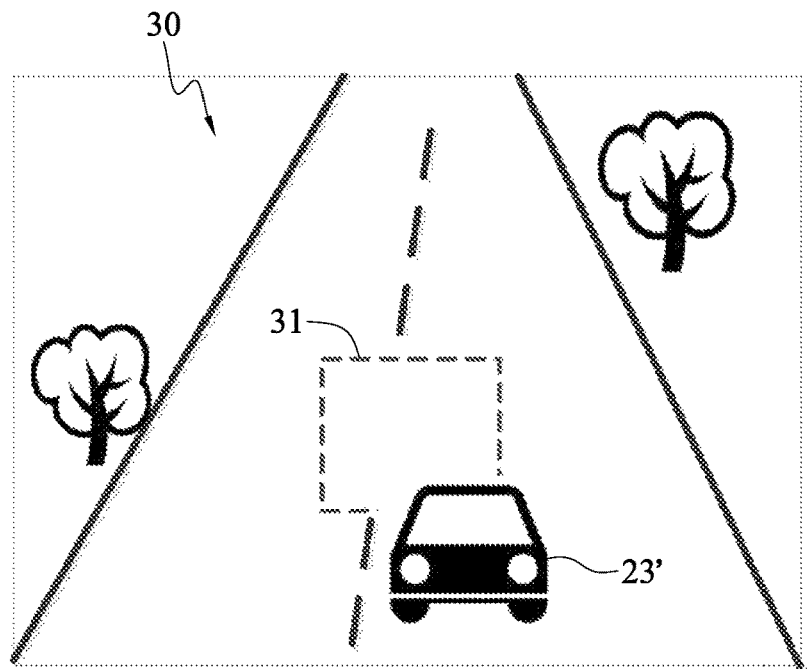
FIG. 7 is a schematic diagram depicting a virtual image generated in accordance with the first embodiment of the present disclosure.

In step S26, as shown in FIG. 7, the frame is shifted according to the second set of optical flow vectors 200' and 210'. For example, the object 23 shown in FIG. 3 is shifted to the location of object 23' shown in FIG. 7, thus generating a virtual image 30. In an embodiment, a frame that occurs later in time can be chosen as the frame being shifted, but the present disclosure is not limited as such.

In an embodiment, assuming the set of frames in a video is X={$X^1$, $X^2$, ..., $X^m$}, a set of virtual images to be generated is Y={$Y^1$, $Y^2$, ..., $Y^n$}. Assuming that the first set of optical flow vectors is Ed, the network latency information is represented as λ={direction, speed, timestamp}, wherein direction, speed are the moving direction and traveling speed of the image capture unit (that is, the moving direction and traveling speed of the remotely controlled unmanned vehicle), and timestamp is the timestamp of a frame of a video obtained by the remote end, then at least one difference between the estimated set of virtual images Y and the set of frames actually received X can be represented by an equation $$L_p(X,Y)=\|(E_d(X)+\lambda)-Y\|^p (p=1 \text{ or } p=2).$$

In another example, after a virtual image is obtained, the following steps can be performed. In step S27, at least one patched area in the virtual image is obtained. In an embodiment, differences between the virtual image and one of the at least two frames being shifted based on the set of second optical flow vectors, for example, the difference between the location of the object 23' in the frame of FIG. 7 and the location of the object 23 in the frame of FIG. 3, are calculated to obtain a patched area 31 in the virtual image 30 shown in FIG. 7. The method proceeds to step 28.

Figure 8:
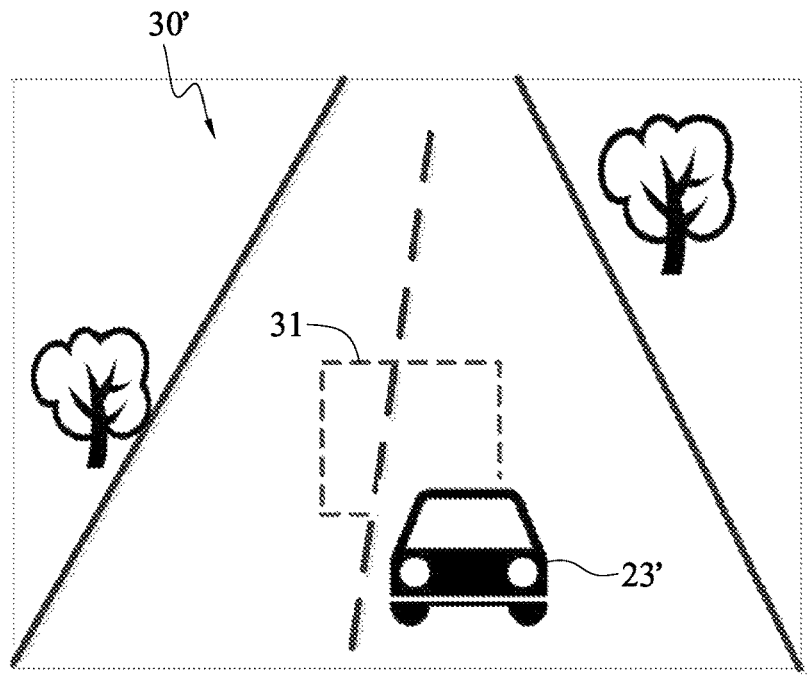
FIG. 8 is a schematic diagram depicting a virtual image generated in accordance with the second embodiment of the present disclosure.

In step 28, image restoration is performed on the patched area 31 by a second algorithm, for example, based on an exemplar-based image inpainting (EBI) method. FIG. 8 shows a virtual image 30' after restoration, wherein the zero crossing is restored in the patched area. In an embodiment, since the patched area is obtained by comparing the difference between the location of the object 23' in the frame of FIG. 7 and the location of the object 23 in the frame of FIG.

3, more time and effort are saved than the prior art where a target block is manually selected for restoration.

Figure 9:
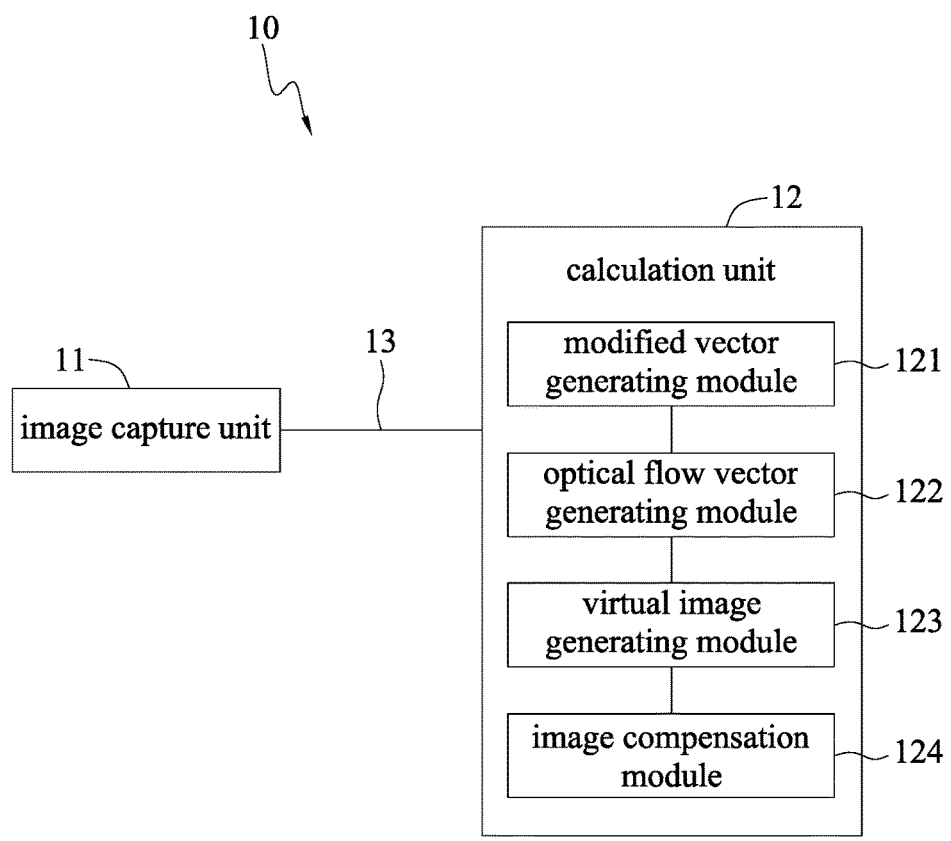
FIG. 9 is a schematic diagram depicting a system for generating a video frame in accordance with the present disclosure.

Referring to FIG. 9, a system for generating a video frame 10 is further provided by the present disclosure, which includes an image capture unit 11 and a calculation unit 12. The calculation unit 12 includes a modified vector generating module 121, an optical flow vector generating module 122 and a virtual image generating module 123. Some of the technical contents of the system for generating a video frame 10 of the present disclosure are the same as those described with respect to the method for generating a video frame above, and therefore will not be repeated.

In an embodiment, the calculation unit 12 is an electronic device having a processor, e.g., a computer, a mobile phone, a tablet or a remote controller with a screen (for a remotely controlled unmanned vehicle). In another embodiment, the module is software performed by a processor.

The image capture unit 11 is used for capturing a video, and can be provided on a remotely controlled unmanned vehicle. The calculation unit 12 is connected to the image capture unit 11 via a network 13 (e.g., 4G, Wi-Fi, WIFI, WiMAX or the like), and is used for receiving the video captured by the image capture unit 11. In an embodiment, the video can first be subjected to real-time video data compression and then transmitted to the calculation unit 12 through the network 13 in a streaming manner. In another embodiment, the video, after being transmitted to the calculation unit 12, can be stored in a storage medium (e.g., a hard disk or a memory) of the calculation unit 12 for further processing.

The modified vector generating module 121 of the calculation unit 12 is configured for generating a set of modified vectors based on at least one parameter. In an embodiment, the parameter is the latency information of network 13, the direction of the image capture unit 11, the speed of the image capture unit 11, or a combination of the above.

The optical flow vector generating module 122 of the calculation unit 12 is configured for calculating a first set of optical flow vectors of at least two frames in the video by a first algorithm. In an embodiment, the first algorithm is an optical flow estimation method. In another embodiment, the at least two frames are contiguous or non-contiguous frames in time, and an object that appears in both of the at least two frames is used as a reference. After calculating a set of optical flow vectors of objects in the at least two frames in the video by the first algorithm, the optical flow vector generating module 122 is configured for determining whether the objects are stationary or moving, and modifying the set of optical flow vectors of the objects in the at least two frames based on a set of optical flow vectors corresponding to the stationary objects to obtain the first set of optical flow vectors.

After generating the set of modified vectors by the modified vector generating module 121, the optical flow vector generating module 122 is further configured for combining the set of modified vectors and the first set of optical flow vectors to generate a second set of optical flow vectors.

The virtual image generating module 123 of the calculation unit 12 is configured for shifting one of the at least two frames according to the second set of optical flow vectors to generate a virtual image. The virtual image can be displayed on a screen of the calculation unit 12 for user viewing. The virtual image can also be transmitted to an external screen through the network of the calculation unit 12. In an embodiment, the calculation unit 12 is a cloud server, and, after the virtual image is calculated, the virtual image can be transmitted to a screen of a controller for controlling the unmanned vehicle.

The system for generating a video frame 10 according to the present disclosure further includes an image compensation module 124 configured for calculating differences between the virtual image and the one of the at least two frames being shifted based on the second set of optical flow vectors to obtain a patched area in the virtual image, and performing image compensation on the patched area by a second algorithm. In an embodiment, the second algorithm is an exemplar-based image inpainting (EBI) method. This part of the technical contents is as described before, and will not be repeated.

With the method and the system for generating a video frame according to the present disclosure, a first set of optical flow vectors of at least two frames in a video is obtained, a set of modified vectors is generated based on a parameter, and the first set of optical flow vectors and the set of modified vectors are combined to obtain a second set of optical flow vectors. The second set of optical flow vectors is the estimated optical flows, which can be used for generating an estimated virtual image. The virtual image can reduce the deviation caused by the latency of the network. The present disclosure is suitable for long-range (5 km or more) wireless network environment, and can effectively eliminate the deviation caused by time delays of the network transmissions. The virtual image with low latency also improves user experience associated with operating of the unmanned vehicle (e.g., a car or an aircraft).

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A method for generating a video frame, comprising:
   obtaining at least two frames in a video captured by an image capture unit through a network;
   calculating a first set of optical flow vectors of the at least two frames by a first algorithm;
   generating a set of modified vectors according to at least one parameter;
   combining the set of modified vectors and the first set of optical flow vectors to obtain a second set of optical flow vectors;
   shifting one of the at least two frames according to the second set of optical flow vectors to generate a virtual image;
   calculating a difference between the virtual image and the one of the at least two frames being shifted based on the second set of optical flow vectors to obtain a patched area in the virtual image, and
   performing image compensation on the patched area by a second algorithm, wherein the second algorithm is an exemplar-based image inpainting (EBI) method.

2. The method of claim 1, wherein calculating the first set of optical flow vectors of the at least two frames by the first algorithm includes:
   calculating optical flow vectors of objects in the at least two frames by the first algorithm;
   determining whether the objects are stationary or moving; and modifying the optical flow vectors of the objects in the at least two frames based on optical flow vectors corresponding to the stationary objects to obtain the first set of optical flow vectors.

3. The method of claim 2, wherein the at least two frames are contiguous frames in time.

4. The method of claim 2, wherein the at least two frames are non-contiguous frames in time.

5. The method of claim 2, wherein the at least two frames have the same object.

6. The method of claim 1, wherein the first algorithm is an optical flow method.

7. The method of claim 1, wherein the parameter is latency information of the network, a direction of the image capture unit, a speed of the image capture unit, or a combination thereof.

8. A system for generating a video frame, comprising:
an image capture unit configured for capturing a video; and
a calculation unit connected with the image capture unit through a network and configured for receiving at least two frames in the video, the calculation unit including:
a modified vector generating module configured for generating a set of modified vectors based on at least one parameter;
an optical flow vector generating module configured for calculating a first set of optical flow vectors of the at least two frames by a first algorithm, and combining the set of modified vectors and the first set of optical flow vectors to generate a second set of optical flow vectors;
a virtual image generating module configured for shifting one of the at least two frames based on the second set of optical flow vectors to generate a virtual image; and
an image compensation module configured for calculating a difference between the virtual image and the one of the at least two frames being shifted based on the second set of optical flow vectors to obtain a patched area in the virtual image, and performing image compensation on the patched area by a second algorithm, wherein the second algorithm is an exemplar-based image inpainting (EBI) method.

9. The system of claim 8, wherein the optical flow vector generating module is configured for calculating optical flow vectors of objects in the at least two frames by the first algorithm, determining whether the objects are stationary or moving, and modifying the optical flow vectors of the objects in the at least two frames based on optical flow vectors corresponding to the stationary objects to obtain the first set of optical flow vectors.

10. The system of claim 8, wherein the at least two frames are contiguous frames in time.

11. The system of claim 8, wherein the at least two frames are non-contiguous frames in time.

12. The system of claim 8, wherein the at least two frames have the same object.

13. The system of claim 8, wherein the first algorithm is an optical flow method.

14. The system of claim 8, wherein the parameter is latency information of the network, a direction of the image capture unit, a speed of the image capture unit, or a combination thereof.

15. The system of claim 8, wherein the calculation unit is a computer, a mobile phone, a tablet or a remote controller with a screen.

* * * * *